United States Patent [19]

Lehmann

[11] 4,249,290
[45] Feb. 10, 1981

[54] CONTROLLED DEFLECTION ROLL

[75] Inventor: Rolf Lehmann, Rudolfstetten, Switzerland

[73] Assignee: Escher Wyss Ltd., Zurich, Switzerland

[21] Appl. No.: 876,632

[22] Filed: Feb. 10, 1978

[30] Foreign Application Priority Data

Feb. 17, 1977 [CH] Switzerland ............ 1967/77

[51] Int. Cl.³ .......................................... B21B 13/02
[52] U.S. Cl. .......................................... 29/116 AD
[58] Field of Search .......... 29/113 AD, 116 AD, 117; 100/162 B, 163 A

[56]  References Cited

U.S. PATENT DOCUMENTS

| 3,430,319 | 3/1969 | Skaugen | 29/116 AD |
| 3,990,935 | 11/1976 | Lehmann | 29/116 AD X |
| 4,058,877 | 11/1977 | Lehmann | 29/116 AD |
| 4,058,878 | 11/1977 | Lehmann | 29/116 AD |

FOREIGN PATENT DOCUMENTS

| 2504149 | 7/1976 | Fed. Rep. of Germany | 79/116 AD |
| 6509484 | 2/1966 | Netherlands | 29/113 AD |

Primary Examiner—Werner H. Schroeder
Attorney, Agent, or Firm—Werner W. Kleeman

[57] ABSTRACT

A controlled deflection roll comprising a tubular-shaped flexible roll shell rotatable about a fixed support. The roll shell is supported by pressure elements arranged in a pressure plane. The pressure elements are movable relative to the fixed support in such pressure plane and serve to exert a pressure force. The roll shell is fixedly retained at its ends to preclude movement perpendicular to the pressure plane. At least one device for influencing lateral deformation of the roll shell is arranged at the support. Such device is equipped with at least one impact or contact surface and cooperates with the inner surface of the roll shell.

10 Claims, 5 Drawing Figures

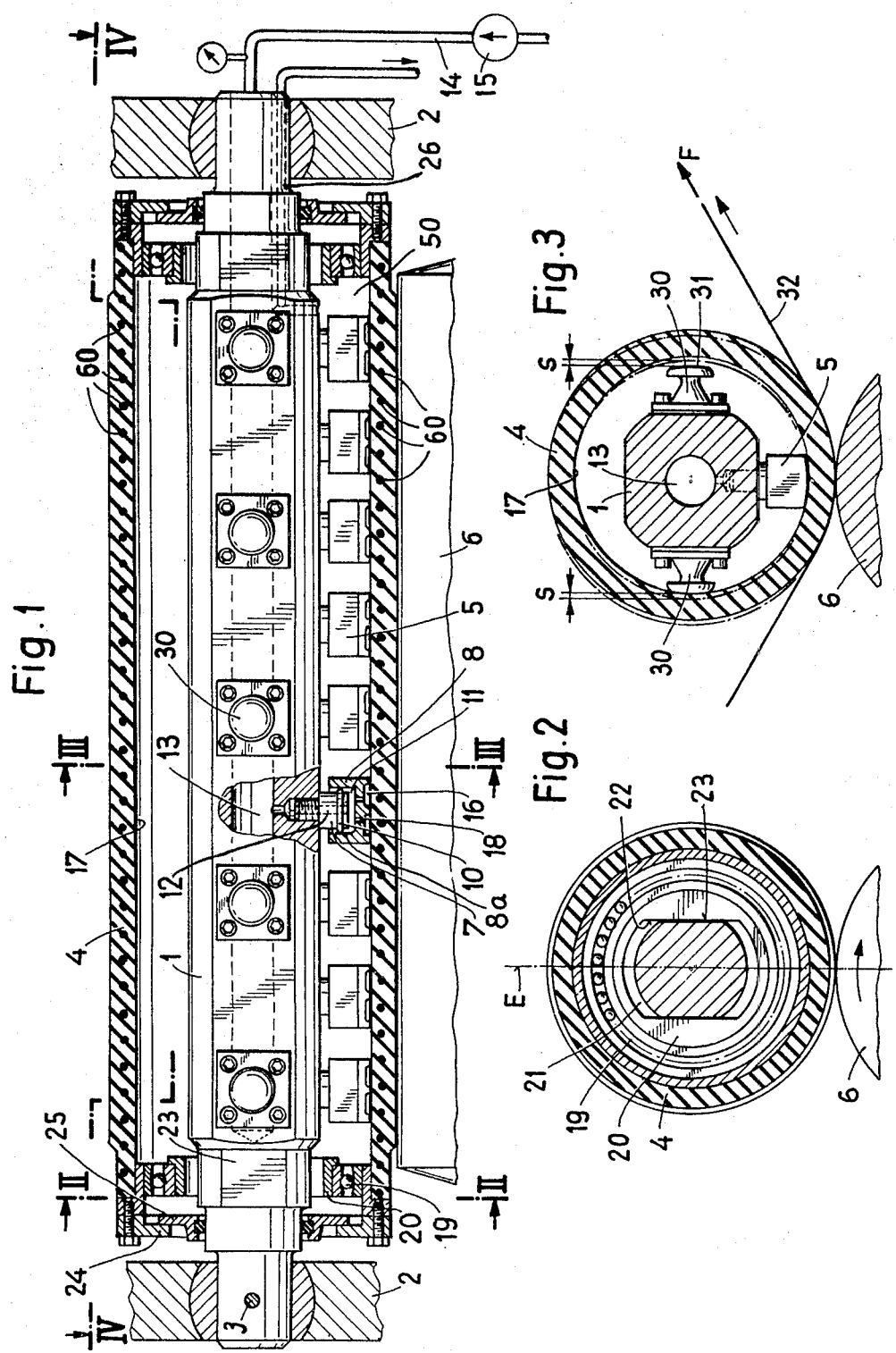

CONTROLLED DEFLECTION ROLL

BACKGROUND OF THE INVENTION

The present invention relates to a new and improved construction of controlled deflection roll of the type comprising a stationary support and a substantially tubular shaped, flexible roll shell rotatable about such support.

In particular, the controlled deflection roll of the present invention—also sometimes referred to in the art as roll with bending compensation—possesses a plurality of pressure elements arranged in a pressure plane and supporting the roll shell. The pressure elements are movable in such pressure plane relative to the stationary support and exert a pressure force. The roll shell is fixedly retained at its ends against movements perpendicular to the pressure plane.

Controlled deflection rolls of this type are known, for instance from the commonly assigned U.S. Pat. Nos. 3,802,044 and 3,885,283 and also from U.S. Pat. No. Re. 26,219. The prior art rolls, wherein the pressure elements are in the form of hydrostatic pistons or punches, ledges or shoes or the like, serve for forming a uniform pressure force, or a pressure force which changes in a desired manner, at the rolling mills or similar devices.

During the rolling of paper webs or textile webs, or at different types of printing devices for printing such type webs and the like, there oftentimes exist the requirement for so-called tentering or stretching rolls, by means of which there can be spread-out the web and tensioned in its transverse direction. Up to the present it was necessary for this purpose to provide special stretching rolls apart from the pressure rolls at the individual devices.

SUMMARY OF THE INVENTION

Therefore, with the foregoing in mind it is a primary object of the present invention to overcome the limitations and shortcomings existing with the pressure rolls of the prior art equipment.

Another and more specific object of the present invention aims at the provision of a new and improved construction of a controlled deflection roll of the previously mentioned type, which not only is extremely suitable for bending compensation i.e. for use as a controlled deflection roll to produce a desired pressure force, but at the same time still can be effectively employed as a stretching roll, whereby it is unnecessary to provide any specific stretching roll as was heretofore the case.

Still a further significant object of the present invention aims at a new and improved construction of a controlled deflection roll which is more versatile in its operation, in that not only provides for bending compensation but also can be used as a stretching roll.

Now in order to implement these and still further objects of the invention, which will become more readily apparent as the description proceeds, the controlled deflection roll of this development is manifested by the features that at the stationary support there is provided at least one device for influencing lateral deformation of the roll shell, this device being equipped with an impact surface which coacts with the inner surface of the roll shell.

By virtue of this design there is obtained bending of the roll shell in a direction perpendicular to the pressure plane, by means of which there can be beneficially realized the desired width stretching effect. Consequently, on the one hand there is precluded the need to provide a specially constructed stretching roll, leading to simplification of the relevant machine installation and a saving in costs. On the other hand, there is additionally obtained an improvement in the mode of operation, since heretofore a stretching roll had to be arranged forwardly of the rolling device or after the same, in other words could not be arranged directly at the work location, i.e. at the pressure location of the rolling device or roller mill. It should be readily apparent that in such case there were possible undesired deformations of the web along the path between the press roll and the stretching roll. By virtue of the inventive measures there is obtained at the pressure location of the rolling device, in optimum manner, the stretching effect simultaneous with the pressure effect. Thus, for instance, at printing devices for printing webs it has been found that due to the stretching effect which is realized with the invention there can be obtained particularly good printing results.

Preferably there can be arranged at the support at least one stop or impact member for limiting the lateral deformation of the roll shell perpendicular to the pressure plane. Between a stop or impact surface of the stop or impact member and the inner surface of the roll shell which cooperates with the impact surface there is present play during a position of the roll shell which is symmetrical to the pressure plane. In this manner there is obtained a particularly simple construction of the roll of the present invention, by means of which the bending of the roll shell for obtaining the stretching effect is realized by the traction force of the web to be treated.

However, it is also possible to construct the device in the form of a punch movable relative to the stationary support and having an impact or stop surface and an hydraulic pressure chamber or compartment which is supplied with hydraulic pressure. Under the action of the hydraulic pressure the impact surface is movable in a direction away from the support towards the inner surface of the roll shell. A controlled deflection roll constructed in this manner ensures for a deformation of the roll shell for obtaining the stretching effect also in those instances where no or only an insufficient tensile force acts upon the treated web, or where, for instance, the roll or its counter roll are driven.

A number of stops or impact members can be arranged along the support at its region located within the roll shell. The play between the impact surfaces and the roll shell located in a symmetrical position with respect to the pressure plane, is greatest at its center corresponding to a desired bending line of the roll shell and reduces in the direction of its ends. This constructional embodiment renders possible a more exact maintenance of the desired bending form under the influence of the aforementioned tensile force, especially in the case of long rolls.

The roll can also be constructed such that at least one of the stops is adjustable from the outside in the direction of and towards the inner surface of the roll shell. Consequently, it is possible, like for the punches or pistons movable relative to the stationary support, to alter during operation the magnitude of the lateral bending of the roll shell and, thus, the width stretching effect.

The pressure elements can be constructed in conventional manner so as to have the form of hydrostatic pistons or punches or the like, which together with the support or a part attached thereto, enclose a hydrostatic pressure chamber. These pistons furthermore possess hydrostatic bearing surfaces confronting the inner surface of the roll shell and to which there is delivered at a suitable pressure an hydraulic pressurized medium. This hydraulic pressurized medium, during operation of the equipment, can efflux through a bearing gap between the bearing surface and the inner surface of the roll shell into the intermediate compartment or chamber between the roll shell and the support. Further, the device for influencing the lateral deformation is equipped with a sliding or contact surface intended to coact with the inner surface of the roll shell. However, it should be understood that the pressure elements also can have the shape of rolls, as for instance disclosed in German patent publication No. 1,070,125 to which reference may be readily had and the disclosure of which is incorporated herein by reference. These roll-shaped pressure elements can be pressed in any appropriate manner against the roll shell. In this case, the device for influencing the lateral deformation also can have impact surfaces in the form of cylindrical surfaces of rotatable rolls.

Additionally, the roll shell also can be rotatably mounted in likewise conventional fashion at its ends at the support. However, it is also possible to rotatably mount the roll shell at its ends at guide elements or parts, for instance in the manner likewise taught in the aforementioned U.S. Pat. No. 3,885,283, the disclosure of which is incorporated herein by reference. These guide parts, in turn, are linearly guided at the support in the pressure plane of the pressure elements.

As already proposed, the roll shell can consist of a rubber elastic or elastomeric material. However, it also can possess a tubular-shaped elastic part which is provided with means for increasing its bending resistance in the peripheral direction. Such type shell has been taught, for instance, in German patent publication No. 25 17 412 to which reference may be had and the disclosure of which is incorporated herein by reference.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 illustrates an axial section view through a roll constructed according to the teachings of the present invention together with a partially shown counter roll;

FIG. 2 is a cross-sectional view, taken substantially along the line II—II of FIG. 1;

FIG. 3 is a cross-sectional view, taken substantially along the line III—III of FIG. 1;

DETAILED DESCRIPTION OF THE PREFERRED EMBODIMENTS

Figure 4:
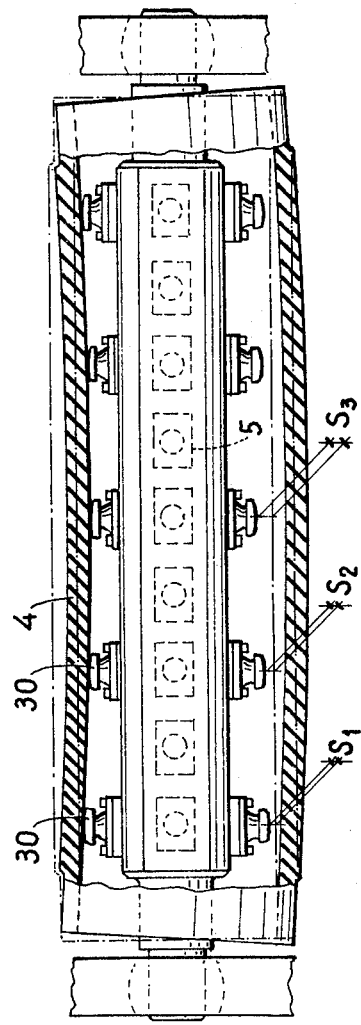
FIG. 4 is a plan view, partially in section, on a somewhat smaller scale and taken substantially along the line IV—IV of FIG. 1.

Describing now the drawings, the roll illustrated by way of example in FIGS. 1 to 3, will be seen to contain a stationary support 1 which is mounted at its opposed ends in a machine frame 2. The stationary support 1 is secured against rotation, for instance by a pin 3 or other suitable securing means. Rotatable about the stationary support 1 is a roll shell 4. As has been taught to the art from the aforementioned U.S. Pat. No. 3,802,044, the roll shell 4 is pressed by hydrostatic pressure elements 5 against a counter roll 6. The hydrostatic pressure elements 5 each contain a hollow pin 7 attached at the support 1. Upon each such hollow pin 7 there is sealingly guided a piston or punch 8 or the like having a bore 8a. The gap between the pin 7 and the related piston 8 is sealed by a seal 10. Between the pin 7 and the piston 8 there is formed a hydrostatic pressure chamber or compartment 11 which is connected by a bore 12 with a pressure medium channel 13 formed in the stationary support 1. The pressure medium channel 13 is connected by means of an hydraulic pressure line or conduit 14 with a pump installation or device 15 furnishing the roll with a pressurized medium, for instance pressurized oil, at a desired pressure.

As also will be apparent from the showing of FIG. 1 and the disclosure of U.S. Pat. No. 3,802,044, the piston 8 is provided with hydrostatic bearing pockets 16 located at its surface confronting the inner surface 17 of the roll shell 4. The bearing pockets 16 are connected by throttle channels 18 with the related pressure chamber 11.

At its end the roll shell 4 is rotatably mounted with the aid of roller bearings 19 at a respective guide element or part 20. Each such guide part or element 20 has an elongate opening 21. Each such opening 21 is provided with flat or planar guide surfaces 22 cooperating with flat or planar guide surfaces 23 of the stationary support 1.

The intermediate space 50 between the support 1 and the roll shell 4 is sealed at the ends of the roll by cover elements 24 attached to the roll shell 4 in any suitable fashion as well as by cover elements 25 which are sealingly guided at the stationary support 1. The hydraulic liquid or fluid medium is delivered from such intermediate space through a channel 26 formed in the support 1.

As described in detail in the aforementioned U.S. Pat. No. 3,802,044, during operation the roll shell 4 is pressed by the hydrostatic pressure elements 5 against the counter roll 6. The pressure of the medium which is effective in the pressure chambers or compartments 11 causes contact of the pistons or punches 8 against the inner surface 17 of the roll shell 4. At the same time the hydraulic fluid medium moves through the throttle channels 18 into the bearing pockets 16 and produces a hydrostatic lubrication with a given gap between the pistons 8 and the inner surface 17 of the roll shell 4.

It should be understood that apart from the hydrostatic pressure elements 5 which have been illustrated in FIG. 1 also other embodiments of such pressure elements could be used, such as for instance taught in the aforementioned U.S. Pat. No. 3,802,044. Thus, for instance, there can be used pistons guided in bores of the support or one or a number of continuous ledges, in place of the pressure elements 5. Also there can be provided in conventional manner a number of channels 13, so that different pressure elements can have imparted thereto different pressures, and thus, there can be formed different contact forces.

During operation, each guide element or part 20 allows for a certain movement of the roll shell 4 in relation to the support 1 in the direction of the guide surfaces 22, 23 which conincides with a pressure plane E of the hydrostatic pressure elements 5. In this way the guide element 20 enables the roll shell 4 to carry out a lift-off movement from the counter roll 6 in the manner described in U.S. Pat. No. 3,885,283. It is here mentioned that, if desired, the flexible tubular roll shell 4 can be provided with suitable reinforcing means, such as the spirally wound reinforcement inserts or cords 60, to increase its bending strength in the circumferential direction thereof.

Now as best seen by referring to FIGS. 1, 3 and 4, there are provided in accordance with the invention stops or impact members 30 at the support 1, these stops having stop or impact surfaces 31 intended to cooperate with the inner surface 17 of the roll shell 4. As can be clearly seen from FIG. 3, stops 30 are mounted stationarily with respect to the support 1. In the rest condition, when the roll shell 4 is located in a symmetrical position with regard to the pressure plane E, there exists play S between the impact surfaces 31 of the stops or impact members 30 and the inner surface 17 of the roll shell 4. This rest condition of the roll shell 4 has been illustrated by chain-dot or broken lines in FIGS. 3 and 4.

If during operation there is effective a tension or traction force F at the treated web 32 which passes between the roll shell 4 and the counter roll 6, then this roll shell 4 deforms in a manner such as has been somewhat exaggerated in the showing of FIG. 4. The flexible, roll shell 4, i.e. the roll shell 4 formed of an elastomeric or rubber elastic material, laterally bows or domes out of the pressure plane E, and specifically to such an extent until it impacts against the stop or impact members 30. In order to obtain a desired arching or doming of the roll shell 4, with the arrangement of FIG. 4, the play S1, S2 and S3 of the individual stop or impact members 30 is different, and specifically such that it increases from both ends of the roll towards its center.

Due to the bending i.e. doming of the roll shell 4 which is obtained in this manner, there is realized with very little additional means for the subject roll a stretching or spreading effect, whereby the web 32 which is to be treated is laterally stretched and held taut.

In principle, for a given direction of movement of the web 32 stops 30 provided at only one side of the support 1 could be sufficient. If according to the arrangement of FIGS. 3 and 4 the stops 30 are disposed at both sides of the support 1, there is thus rendered possible operation of the roll in two opposite directions.

Figure 5:
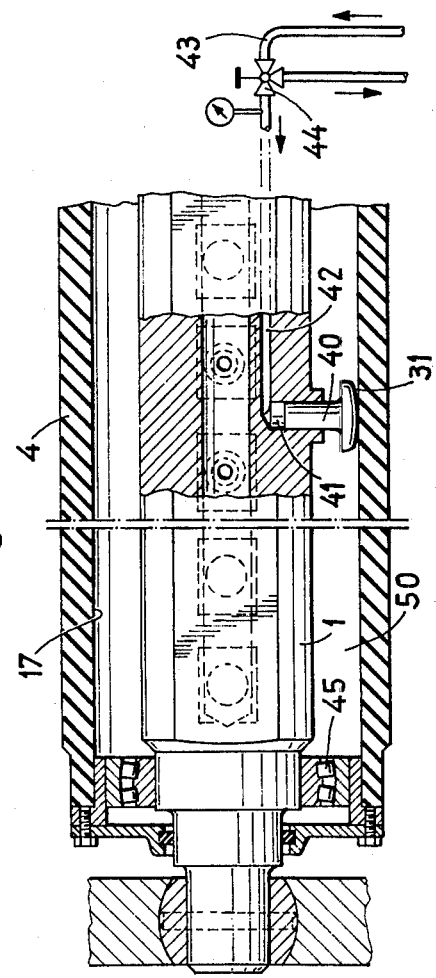
FIG. 5 is a partial sectional view, corresponding essentially to the showing of FIG. 4, of a different embodiment of roll.

FIG. 5 illustrates an exemplary embodiment of an inventive roll wherein the bending of the roll shell 4 can be influenced from the outside, and specifically under circumstances when a traction or tension force F does not act upon the web 32. With the embodiment of FIG. 5 there is guided in the support 1 at least one piston 40 in a bore 41 and which piston 40 possesses the impact or stop surface 31. The piston 40 is connected by means of a channel 42 formed in the support 1 with a pressure line or conduit 43 having a pressure regulating valve 44. By means of the pressure regulating valve 44 it is possible to adjust the pressure or compressive force with which the piston 40 is pressed against the inner surface 17 of the roll shell 4. Since the roll shell 4 is elastic, it is possible to set in each case, by suitable selection of the pressure force, a desired arching or doming of the roll shell 4. Hence, there is also taken into account at the same time also forces which are effective at the roll shell 4 due to the action of the material web 32.

The roll illustrated in FIG. 5 has the advantage that it is not dependent upon the magnitude of the traction or tension force F of the material web 32 for obtaining the stretching or spreading action. The roll shell 4 can be driven in any conventional manner known to the art, and the force F acts in the opposite direction since the roll shell 4 pulls the material web 32.

With the embodiment of FIG. 5 the roll shell 4 is not mounted directly at the guide elements 20, rather directly at the support 1 with the aid of roller bearings 45. It should be understood that such type mounting also can be employed for the embodiment of roll according to FIGS. 1 to 3.

In FIG. 5, the piston 40 is actuated by selection of the hydraulic pressure which is effective thereat. It should be understood that there also can be conceivably employed a mechanical actuation of the piston 40 from the outside, the actuation being accomplished in such a manner that the piston 40 can be moved towards the support 1 or away therefrom.

In the embodiment under discussion a hydraulic lubrication is present between the impact surfaces 31 and the inner surface 17 of the roll shell 4, since in the intermediate space 50 between the support 1 and the roll shell 4 there is located the hydraulic medium which flows out of the pressure elements 5. There are, however, conceivable exemplary embodiments of controlled deflection rolls, wherein, for instance, as taught in German Pat. No. 1,070,125 the pressure elements are equipped with rolls or rollers upon which travel the inner surface of the roll shell. In such case the stops or impact members 30 and also the pistons 40 can be provided with rollers or rolls possessing the impact surfaces 31 and rolling upon the roll shell.

The teachings of the present invention also can be used in comparable manner in the case of controlled deflection rolls where the punches or pistons 5 are hydrostatically pressed against the inner surface 17 of the roll shell 4, and between the punches or pistons 5 and the roll shell 4 there is however not present an hydrostatic lubrication, rather only an hydrodynamic lubrication.

The size of the gaps S, S1, S2, S3, as a general rule, amounts to several tenths of a millimeter, but at most to only a few millimeters.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A controlled deflection roll comprising:
   a stationary support;
   a substantially tubular-shaped flexible roll shell;
   means for mounting said substantially tubular-shaped roll shell to be rotatable about said stationary support;
   a plurality of movable pressure elements for supporting said roll shell;
   said pressure elements being arranged in a pressure plane and movable in such pressure plane relative to the support for exerting a pressure force;
   means for fixedly retaining the roll shell at its ends against movement in a direction substantially perpendicular to the pressure plane;
   at least one device for enabling and limiting lateral deformation of the roll shell in a direction substantially perpendicular to the pressure plane arranged at said stationary support and mounted stationarily with respect thereto externally of the pressure plane;

said roll shell having an inner surface;

said at least one device being provided with an impact surface cooperating with said inner surface of said roll shell at a location externally of the pressure plane.

2. The controlled deflection roll as defined in claim 1, wherein:

said at least one device comprises at least one impact member arranged at said stationary support and serving to limit the lateral deformation of the roll shell in said direction substantially perpendicular to the pressure plane;

said impact member being provided with said impact surface; and play prevailing between the impact surface of the impact member and the inner surface of the roll shell which cooperates with said impact surface when the roll shell assumes a position which is essentially symmetrical with respect to the pressure plane.

3. The controlled deflection roll as defined in claim 1, wherein:

said at least one device comprises a piston movable relative to the stationary support and equipped with said impact surface;

said piston having a hydraulic pressure chamber which can be impinged with an hydraulic pressurized fluid medium;

means for delivering hydraulic pressurized fluid medium to said hydraulic pressure chamber for moving the impact surface in a direction away from the stationary support and towards the inner surface of the roll shell.

4. The controlled deflection roll as defined in claim 2, further including:

a plurality of said impact members arranged along said stationary support at a region thereof located within the roll shell;

each of said impact members being provided with one said impact surface;

the respective play between the impact surfaces and the roll shell located in a symmetrical position with respect to the pressure plane being greatest at the center of the roll shell and decreasing in the direction of the ends of the roll shell in accordance with a desired deflection line of the roll shell.

5. The controlled deflection roll as defined in claim 4, further including:

means for adjusting at least one of the impact members from externally of the controlled deflection roll in a direction from and towards the inner surface of the roll shell.

6. The controlled deflection roll as defined in claim 1, wherein:

said pressure elements comprise hydrostatic pistons;

each of said hydrostatic pistons together with the stationary support forming therebetween a hydrostatic pressure chamber;

each of said pistons being provided with hydrostatic bearing surfaces at a side confronting the inner surface of the roll shell;

means for delivering an hydraulic pressurized fluid medium to said pressure chambers and said hydrostatic bearing surfaces which, during operation, flows out through a bearing gap between the bearing surfaces and the inner surface of the roll shell into an intermediate space between the roll shell and the stationary support;

said at least one device for influencing the lateral deformation being equipped with a slide surface which coacts with the inner surface of the roll shell.

7. The controlled deflection roll as defined in claim 1, wherein:

said mounting means mounts said roll shell at its ends to be rotatable at the stationary support.

8. The controlled deflection roll as defined in claim 1, wherein:

said mounting means for said roll shell comprises guide elements for rotatably mounting the roll shell at its ends; and means for guiding said guide elements at the stationary support essentially linearly in the pressure plane of the pressure element.

9. The controlled deflection roll as defined in claim 1, wherein:

said roll shell is formed of a rubber elastic material.

10. The controlled deflection roll as defined in claim 1, wherein:

said roll shell embodies a substantially tubular-shaped elastic part having means for increasing its bending resistance in the circumferential direction thereof.

* * * * *